(12) United States Patent
Shringarpure et al.

(10) Patent No.: US 9,590,801 B1
(45) Date of Patent: Mar. 7, 2017

(54) EQUALIZATION SCHEME IN TRANS-IMPEDANCE AMPLIFIER FOR OPTICAL COMMUNICATIONS

(71) Applicant: Avago Technologies General IP (Singapore) Pte. Ltd., Singapore (SG)

(72) Inventors: Rahul Shringarpure, San Jose, CA (US); Chakravartula Nallani, San Jose, CA (US); Georgios Asmanis, Lake Forest, CA (US); Faouzi Chaahoub, San Jose, CA (US); Kishan Venkataramu, Santa Clara, CA (US)

(73) Assignee: Avago Technologies General IP (Singapore) Pte. Ltd. (SG)

( * ) Notice: Subject to any disclaimer, the term of this patent is extended or adjusted under 35 U.S.C. 154(b) by 0 days.

(21) Appl. No.: 14/880,974

(22) Filed: Oct. 12, 2015

(51) Int. Cl.
*H04L 7/00* (2006.01)
*H04L 25/03* (2006.01)
*H04B 10/69* (2013.01)
*H04B 10/61* (2013.01)
*H04L 27/00* (2006.01)

(52) U.S. Cl.
CPC ....... *H04L 7/0075* (2013.01); *H04B 10/6163* (2013.01); *H04B 10/693* (2013.01); *H04L 25/03159* (2013.01); *H04L 27/0002* (2013.01); *H04L 2025/03522* (2013.01)

(58) Field of Classification Search
CPC ............ H04L 7/0075; H04L 25/03159; H04L 27/0002; H04L 2025/03522; H04B 10/693; H04B 10/6163
See application file for complete search history.

(56) References Cited

U.S. PATENT DOCUMENTS

| 8,754,711 | B2 | 6/2014 | Welch | |
|---|---|---|---|---|
| 8,891,704 | B2 | 11/2014 | McLeod et al. | |
| 2015/0084688 | A1* | 3/2015 | Chang | H03H 11/0466 327/555 |

\* cited by examiner

*Primary Examiner* — Leslie Pascal (57) ABSTRACT

An optical communication system, a circuit, and a method of operating an optical communication system are provided. The optical communication system is disclosed to include a photodiode configured to receive optical signals and convert the received optical signals into electrical signals, a Trans-Impedance Amplifier (TIA) electrically connected with the photodiode such that the TIA receives the electrical signals from the photodiode and is configured to convert the electrical signals received from the photodiode into amplified electrical signals, and a feedback loop connected between an input of the TIA and an output of the TIA that includes a switchable capacitor bank connected thereto which introduces at least one zero into a feedback factor transfer function of the TIA thereby tuning out poles or equalizing delay introduced by a TIA input network connected between the photodiode and the input of the TIA.

20 Claims, 7 Drawing Sheets

EQUALIZATION SCHEME IN TRANS-IMPEDANCE AMPLIFIER FOR OPTICAL COMMUNICATIONS

FIELD OF THE DISCLOSURE

The present disclosure is generally directed toward equalization techniques for use with high-speed circuits.

BACKGROUND

A Trans-Impedance Amplifier (TIA) is an amplifier that converts current to voltage. A TIA can be used as part of a receiver for optical communication to convert electrical current pulse generated by a photodiode to a voltage signal for further processing. This is particularly useful due to the fact that the photo-current pulse output of the photodiode is relatively small and in need of amplification prior to being used in other circuits. Moreover, when used in connection with high data rateoptical communication systems, the time period of the photo current pulses get shorted and the TIA electrical bandwidth becomes important.

Unfortunately, designing an amplification circuit for a photodiode at a high data rate is not always straight forward. In particular, if a large resistor is connected across a feedback path of the amplifier, the photodiode's shunt capacitance will cause the amplifier bandwidth to decrease and in some cases may result in oscillations.

An equalization circuit is used to adjust a relative amplitude of frequency components of an electrical signal. For example, an equalization circuit in an optical communication system may adjust an electrical signal over the optical link such that a frequency response of the optical link is substantially flat over a specified range of frequency.

BRIEF DESCRIPTION OF THE DRAWINGS

The present disclosure is described in conjunction with the appended figures, which are not necessarily drawn to scale.

DETAILED DESCRIPTION

The ensuing description provides embodiments only, and is not intended to limit the scope, applicability, or configuration of the claims. Rather, the ensuing description will provide those skilled in the art with an enabling description for implementing the described embodiments. It being understood that various changes may be made in the function and arrangement of elements without departing from the spirit and scope of the appended claims.

Various aspects of the present disclosure will be described herein with reference to drawings that are schematic illustrations of idealized configurations. As such, variations from the shapes of the illustrations as a result, for example, circuit configurations, manufacturing techniques and/or tolerances, are to be expected. Thus, the various aspects of the present disclosure presented throughout this document should not be construed as limited to the particular circuit elements illustrated and described herein but are to include deviations in circuits and functionally-equivalent circuit components.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and this disclosure.

Although embodiments of the present disclosure will be described in connection with equalization circuitry for a photodiode, such as a PIN diode, and a Trans-Impedance Amplifier (TIA), it should be appreciated that embodiments of the present disclosure are not so limited. To the contrary, any circuit element exhibiting a behavior that can benefit from some type of equalization could utilize embodiments of the present disclosure. Furthermore, embodiments of the present disclosure are not limited to communication systems or optoelectronic components of communication systems. Instead, embodiments of the present disclosure can be used in a wide variety of environments including computing applications, server applications, data centers, etc.

To save power and increase data handling capacity per channel, optical communication systems have multiple single-ended receiver channels. Typically, the optical receiver channel has a wide-bandwidth TIA at is Analog Front End (AFE), which converts the photodiode current to voltage. Unlike conventional low-noise amplifiers (LNA), which are terminated with a transmission line at its input, the TIA input includes the photodiode followed by either a bond-wire (in case of a bare die IC) or a transmission line (in case of a packaged IC) connecting the photodiode to the on-chip bond-pad. The typical photodiode capacitance is usually between 100.0 fF and 200.0 fF and the bond-wire inductance varies between 300 pH and 500 pH. In the case of the transmission line interfaced to the photodiode, the typical transmission line has a finite signal bandwidth and di-electric and conductive losses.

Modern optical communication systems transmit data at 400 Gbps or higher and have multiple optical receiver channels receiving 28 Gbps per channel. Hence, the TIA used in the optical receiver requires more than 20 GHz to 25 GHz of bandwidth. The large photodiode capacitance reduces TIA bandwidth, which results in lowering the maximum optical receiver data rate. Moreover, high-speed optical communication systems use modulation schemes such as PAM-4 requiring lower group delay variation and flatter AC response. The bond-wire inductance or transmission line causes group delay variation and peaking in the AC response, which results in overshooting and undershooting of the received data. Accordingly, an equalization scheme at the input of the TIA is provided which compensates for the losses introduced by the transmission line, the bonding pad, and other sources and extends the optical receiver channel's maximum data rate.

As will be discussed in further detail herein, a bandwidth enhancement and equalization scheme is proposed that introduces a tunable capacitor bank in the resistor feedback path of the TIA. The feedback resistor, in some embodiments, is split into two equal resistors and the tunable capacitor bank is introduced between the resistors. Introduction of the tunable capacitor bank adds at least one feedback zero, thereby boosting high-frequency components selectively and can, therefore, be used as a single-ended equalizer.

The proposed equalization scheme includes a T-type feedback network incorporating the tunable capacitor bank. The feedback zero introduced by the T-network can implemented using passive on-chip capacitors which can be easily implanted into modern semiconductor processes. The T-type feedback network can also be used to equalize the delay introduced by the transmission line or the bond-wire. Furthermore, the proposed equalization scheme offers a low power solution as passive components can be utilized. Further still, because on-chip capacitors can be used as part of the tunable capacitor bank, the on-chip capacitors have less on-wafer mismatch effects and, therefore, will have less TIA bandwidth variation between multiple optical receiver channels. The capacitor(s) in the tunable capacitor network can also consume much less are on the chip as compared to inductors used in previous equalization schemes.

Figure 1:
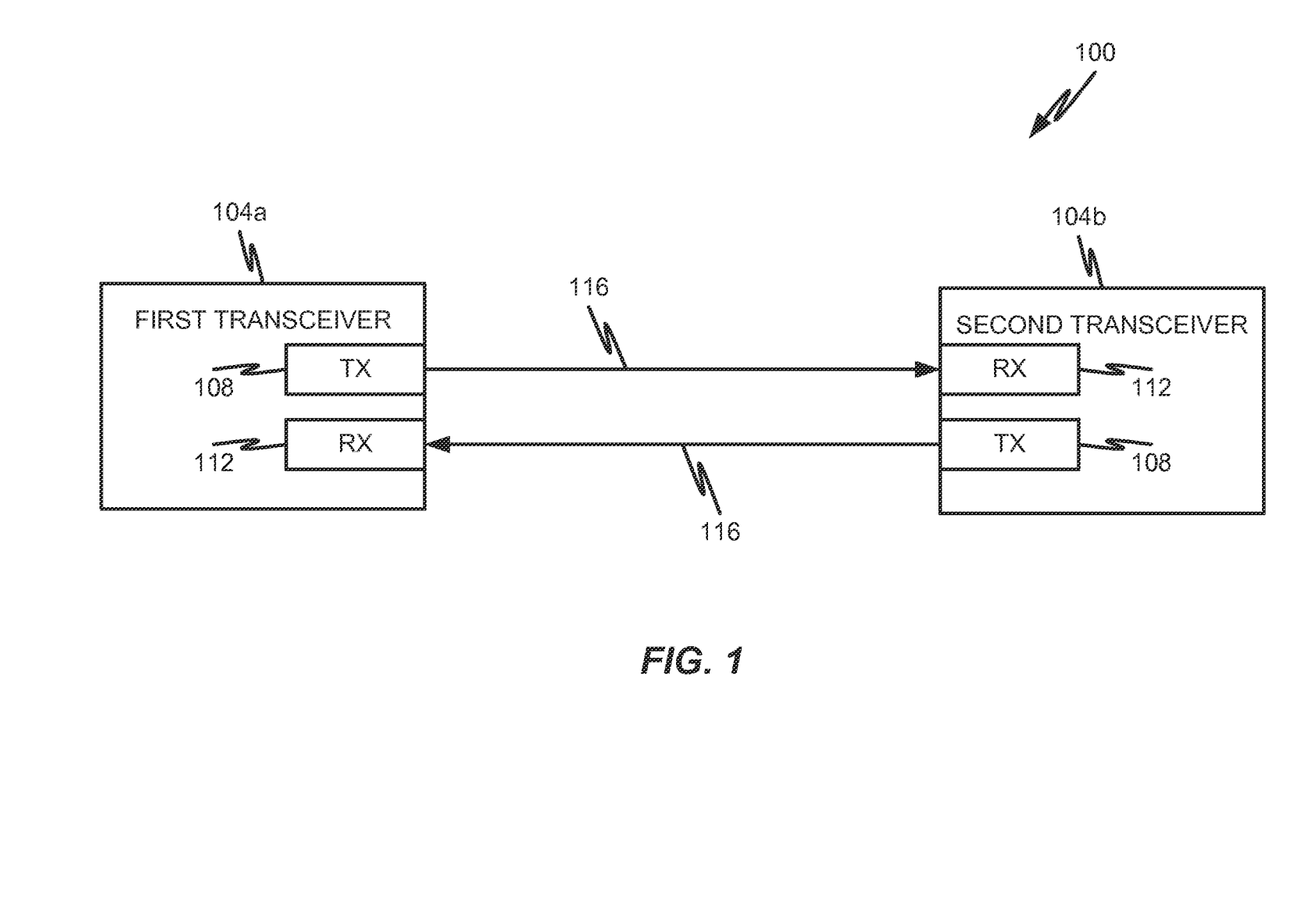
FIG. 1 is a block diagram depicting an optical communication system in accordance with at least some embodiments of the present disclosure.

With reference now to FIG. 1, an illustrative communication system 100 in which embodiments of the present disclosure may be utilized will be described. The system 100 is shown to include one or more transceivers 104a, 104b, each having a transmitter 108 and a receiver 112. The transceivers 104a, 104b are shown to communicate with one another via one or more communication channels 116 that connect a transmitter 108 with a receiver 112. It should be appreciated that embodiments of the present disclosure may also be implemented in a communication system having dedicated transmitters 108 and receivers 112 instead of a combination of a transmitter 108 and receiver 112 being implemented in a transceiver 104.

It should be appreciated that the communication channel 116 may traverse long or short distances. For instance, the communication channel 116 may correspond to a short interconnection between components on an IC chip. In some embodiments, the communication channel 116 may correspond to an optical communication medium (e.g., a fiber optic cable) between 5 ft and 20 ft long. As another example, the communication channel 116 may correspond to a long interconnection (e.g., on the order of miles) between a transmitting station and a receiving station.

In a specific, but non-limiting example of the communication system, signals carried between the transmitter 108 and receiver 112 are transmitted at a relatively high bit rate (e.g., 10 Gbps, 25 Gbps, or greater) using a modulation technique that doubles the achievable data rate for a given link bandwidth. More specific types of modulation techniques that may be used in the communication system 100 include, without limitation, a Pulse Amplitude Modulation (PAM)-4 modulation scheme (or a QAM-16 or QAM-64 modulation scheme.

Figure 2:
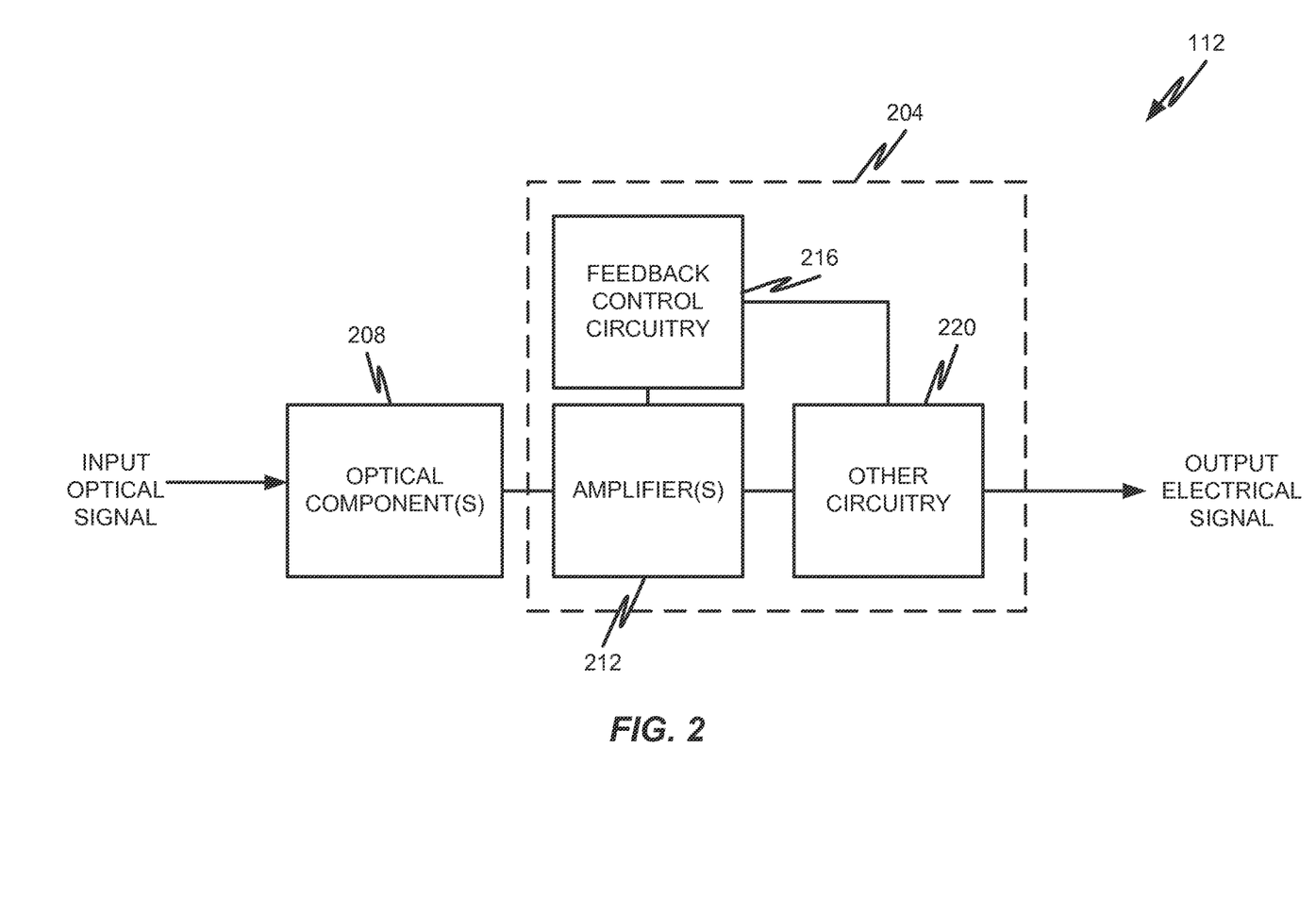
FIG. 2 is a block diagram depicting an optical receiver in accordance with at least some embodiments of the present disclosure.

With reference now to FIG. 2, additional details of a receiver 112 will be described in accordance with at least some embodiments of the present disclosure. The receiver 112 is shown to include an Integrated Circuit (IC) chip 204 connected to one or more optical components 208. The IC chip 204 is further shown to include one or more amplifiers 212, feedback control circuitry 216, and other circuitry 220.

The receiver 112 is configured to receive an input optical signal and produce an output electrical signal using the combined functionality of the optical component(s) 208 and the IC chip 204. Although certain components are depicted as being integrated into the IC chip 204, it should be appreciated that some of those components may be provided external to the IC chip 204. For instance, some or all of the feedback control circuitry 216 may be provided external to the IC chip 204. As another example, some or all of the amplifiers 212 may be provided external to the IC chip 204. As will be discussed herein, however, there may be certain advantages to including some components in the IC chip 204, such as the ability to provide an integrated solution for the receiver 112 and/or provide a common ground for both the amplifier(s) 212 and feedback control circuitry 216.

The optical component(s) 208 may correspond to any type of active or passive optoelectronic device or collection of devices that are capable of converting optical signals into electrical signals. Examples of such optical components include PN photodiodes, PIN photodiodes, arrays of PN photodiodes, arrays of PIN photodiodes, and the like. Because the output of the optical component(s) 208 may not be large/strong enough for subsequent processing by other circuitry, the output of the optical component(s) 208 may be provided to the one or more amplifiers 212 for signal amplification. The amplifier(s) 212 may include a TIA or a plurality of TIAs connected serially. The amplifier(s) 212 may provide their output to other circuitry 220, which may or may not be incorporated into the IC chip 204. Suitable examples of other circuitry 220 include variable gain amplifiers (VGAs), digital circuitry components (e.g., logic gates, latches, switches, etc.), and the like. The other circuitry 220 is not a required element of the IC chip 204. Thus, some embodiments of the present disclosure may provide outputs from amplifier(s) 212 as an output electrical signal from the IC chip 204 without passing the amplified output of the amplifier(s) 212 to other circuitry 220. In some embodiments, the IC chip 204 comprises one or more leads or external connectors that connect the circuitry of the IC chip 204 to external circuitry, such as a Printed Circuit Board (PCB) or the like. Thus, the output electrical signal of the IC chip 204 is usually provided to another circuit, collection of circuits, or IC chips via traces or electrically-conductive vias in a PCB or similar type of substrate.

The feedback control circuitry 216, in some embodiments, is configured to equalize the signal output by the amplifier(s) 212. More specifically, the feedback control circuitry 216 may comprise components that enable a transfer function of the amplifier(s) 212 output to be equalized. Even more specifically, the feedback control circuitry 216 may comprise one or more tunable components that are capable of equalizing phase differences in the small-signal response of the amplifier(s) 212.

Figure 3A:
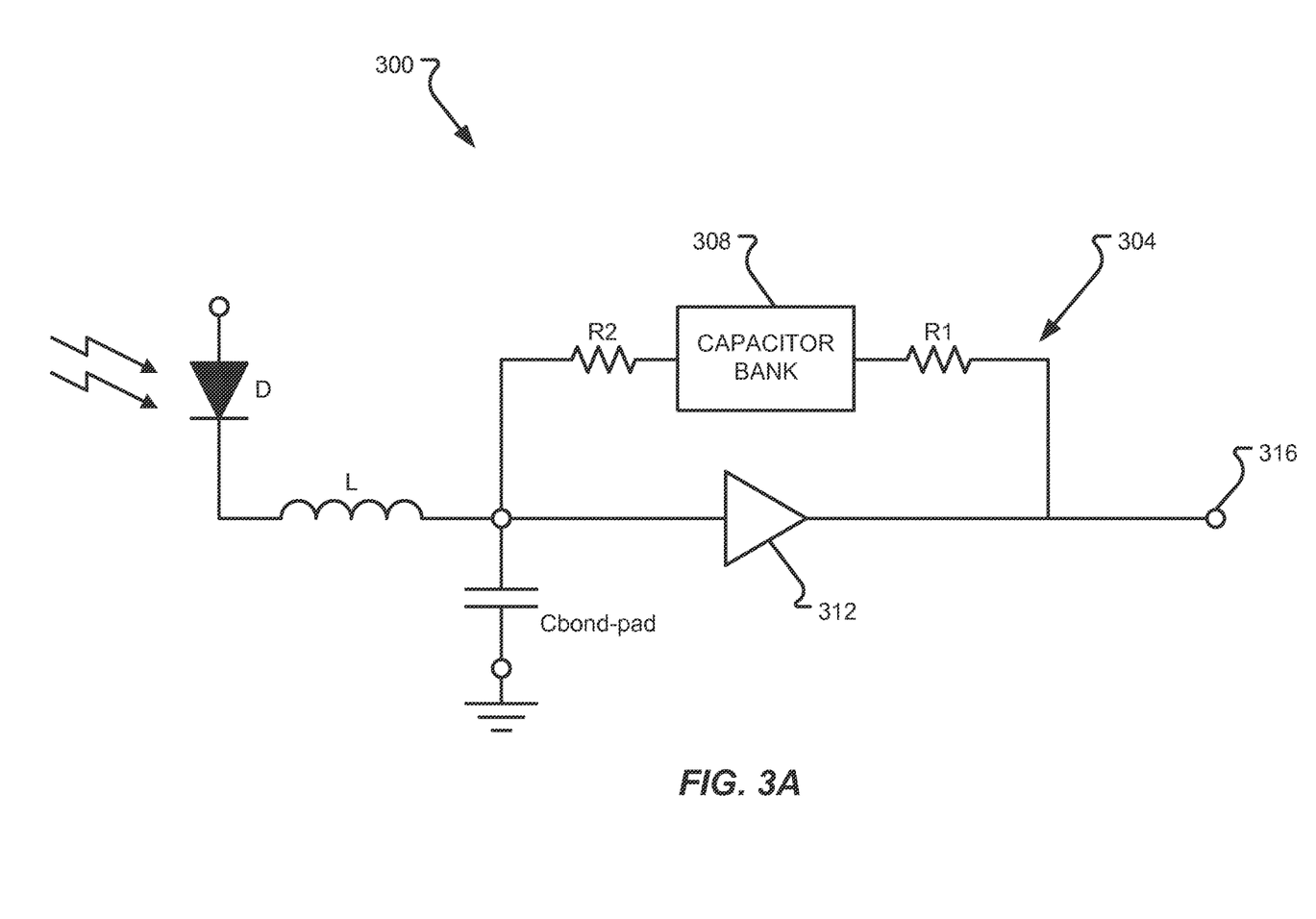
FIG. 3A is a circuit diagram depicting a first implementation of connecting a photodiode to a TIA in accordance with at least some embodiments of the present disclosure.

With reference now to FIG. 3A, additional details of one illustrative receiver circuit 300 will be described in accordance with at least some embodiments of the present disclosure. The circuit 300 is shown to include a photodiode D connected to a TIA 312 via a bond-wire. The bond-wire exhibits an inherent inductance L, which can vary depending upon the size of the bond-wire, the length of the bond-wire, etc. The photodiode D may correspond to an example of the optical component(s) 208 depicted in FIG. 2. The TIA 312 may correspond to an example of the amplifier(s) 212 depicted in FIG. 2.

The bond-wire used to connect the photodiode D to the TIA 312 may connect to the TIA 312 through a bond-pad or lead of the IC chip 204. The bond-pad may also have an inherent capacitance Cbond-pad that contributes to the circuit 300 and the transfer function of the TIA 312.

The circuit 300 is also shown to include a feedback loop or feedback path 304 that provides a feedback control loop for the TIA 312. In some embodiments, the feedback loop 304 and its components may correspond to an example of the feedback control circuitry 216 depicted in FIG. 2. The feedback loop 304 may help to equalize an output 316 of the TIA 312 that is provided to the other circuitry 220.

The feedback loop 304 is shown to include two feedback resistors R1, R2. The feedback resistors R1, R2 may correspond to an evenly split value of a feedback resistance Rf selected for the TIA 312. In other words, the feedback resistance Rf selected for the TIA 312 may be achieved with the combination of both feedback resistors R1, R2. Even more specifically, the resistance of each feedback resistor R1, R2 can be substantially the same, where R1=R2=Rf/2. The feedback loop 304 is also shown to include a tunable capacitor bank 308. The tunable capacitor bank 308 is shown as being positioned between the feedback resistors R1, R2. The tunable capacitor bank 308 may include one or many capacitors that are implemented as passive integrated capacitors on the IC chip 204. The capacitors of the tunable capacitor bank 308 add one or more zeros to the transfer function of the TIA 312. A zero introduces a constant group delay over a wide bandwidth. The different delay introduced by the at the TIA input by the various electrical and optical components at each frequency is equalized at the output 316 of the TIA 312 by adding one or more feedback zeroes, Essentially allowing the TIA to be usable at higher data rates.

Figure 3B:
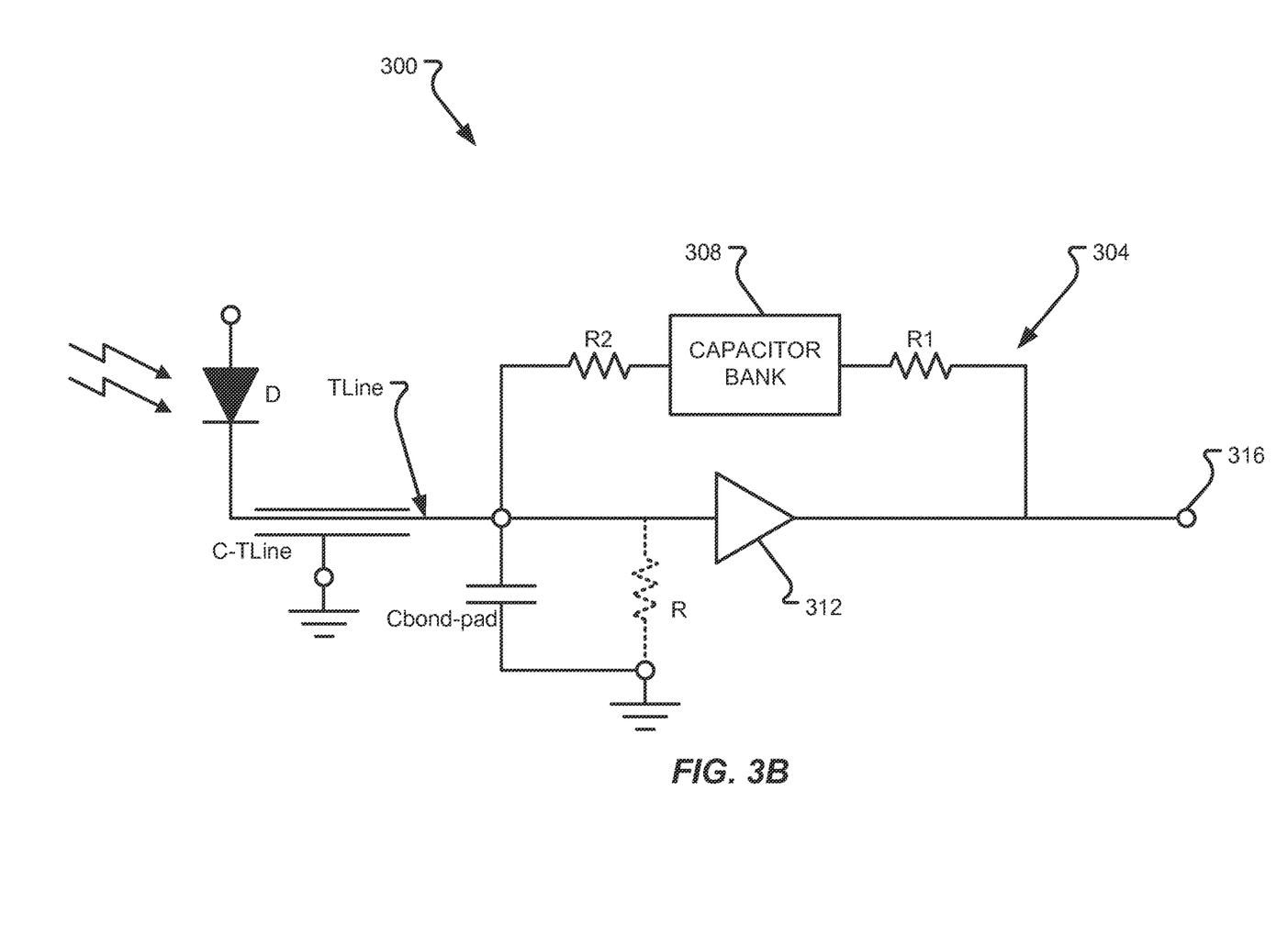
FIG. 3B is a circuit diagram depicting a second implementation of connecting a photodiode to a TIA in accordance with at least some embodiments of the present disclosure.

FIG. 3B shows another variation of the circuit 300 where the connection between the photodiode D and the TIA 312 is achieved via a direct, flip-chip, bonding. Specifically, a terminal of the photodiode D may be directly connected to the bond-pad of the IC chip 204. By completing such a connection, the transmission line Tline may introduce a capacitance C-TLine into the input signal of the TIA 312. Furthermore, an input resistance R may be included in the circuit 300 due to this connection method. The capacitance C-Tline of the transmission line TLine and the additional resistance R may introduce signal imperfections for the input of the TIA 312. The feedback loop 304 may be configured to equalize the frequency dependent delays in the signals for this type of connection method as well as the connection method depicted in FIG. 3A.

The transmission line Tline can be a microstrip, a stripline, a coplanar, or any other shielded metal trace on ground which is matched for reflections and has effectively infinite bandwidth. The transmission line Tline may have an inherent inductance, capacitance, conductive loss, and dielectric loss. The inductance and capacitance of the transmission line Tline substantially define the characteristic impedance (for matching) of the transmission line Tline whereas the conductive loss and dielectric loss define the signal attenuation on the transmission line Tline.

Figure 4:
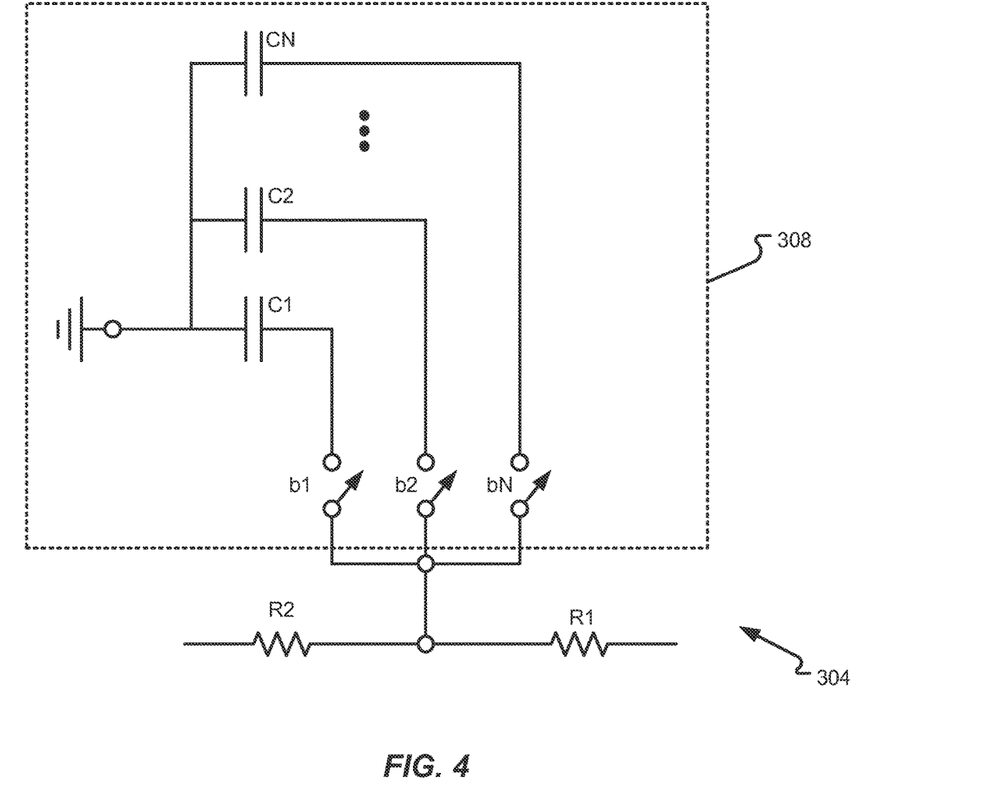
FIG. 4 is a circuit diagram depicting additional details of a capacitor bank used in a TIA feedback path in accordance with at least some embodiments of the present disclosure.

With reference now to FIG. 4, additional details of the capacitor bank 308 and feedback loop 304 will be described in accordance with at least some embodiments of the present disclosure. The capacitor bank 308 is shown to include a bank of capacitors C1-CN that are switchable and connected to the feedback loop 304 in-between the feedback resistors R1, R2. Specifically, a bank of capacitors C1-CN is connected between the feedback resistors R1, R2 in a T-type network where each of the capacitors C1-CN are connected in parallel with one another.

Each capacitor C1, C2, . . . , CN in the bank of capacitors C1-CN may be individually connected to separate switches b1-bN. The switches b1-bN may control whether a particular capacitor C1, C2, . . . , CN is connected between ground and the node between the feedback resistors R1, R2. Each switch b1-bN may be individually controlled such that one, some, or all of the capacitors C1-CN can be selectively connected into the feedback loop 304. The logic used to control whether a switch b1-bN is closed or open may be integrated into the IC chip 204. Depending upon the behavior of the output signal and whether further tuning is desired to further equalize the signal, the switches b1-bN may be opened or closed.

Although FIG. 4 depicts three capacitors C1, C2, CN, it should be appreciated that N may correspond to any integer value greater than or equal to one. Furthermore, there may be situations where only a single capacitor (e.g., just C1 or just C2 or just CN) is connected as part of the feedback loop 304 due to its corresponding switch being closed. In such embodiments, even though only a single capacitor is connected into the feedback loop 304, the capacitor bank 308 may still be considered a tunable capacitor bank.

Each of the capacitors may be integrated capacitors built using the metal into the silicon of the IC chip 204. This provides significant space savings as opposed to using inductors on-silicon. Furthermore, the ground or reference voltage used in the tunable capacitor bank 308 may be the same ground or reference voltage used for the amplifier(s) 212 and other circuitry 220 in the IC chip 204 since all components are implemented on the same IC chip 204. This helps to avoid tuning difficulties due to ground/reference voltage mismatches between different portions of the circuit 300.

In some embodiments, the size of the capacitors C1, C2, . . . , CN may be substantially the same or precisely the same (e.g., within manufacturing tolerances). In some embodiments, the sizes of the capacitors C1, C2, . . . , CN may be different from one another. As an example, the first capacitor C1 may have a capacitance of Cf, the second capacitor C2 may have a capacitance of 2×Cf, and the Nth capacitor may have a capacitance of N×Cf. The size of a capacitance Cf may vary between 10 fF and 100 fF. The tunable nature of the capacitor banks C1-CN enables different levels of equalizing granularity to be used to precisely control the position of the zeroes introduced into the transfer function by the tunable capacitor bank 308. In some embodiments, if phase delay or phase mismatch is observed in the output signal 316, then one or more of the switches b1-bN may be opened or closed as appropriate to further equalize the delay in the output signal 316.

Figure 5:
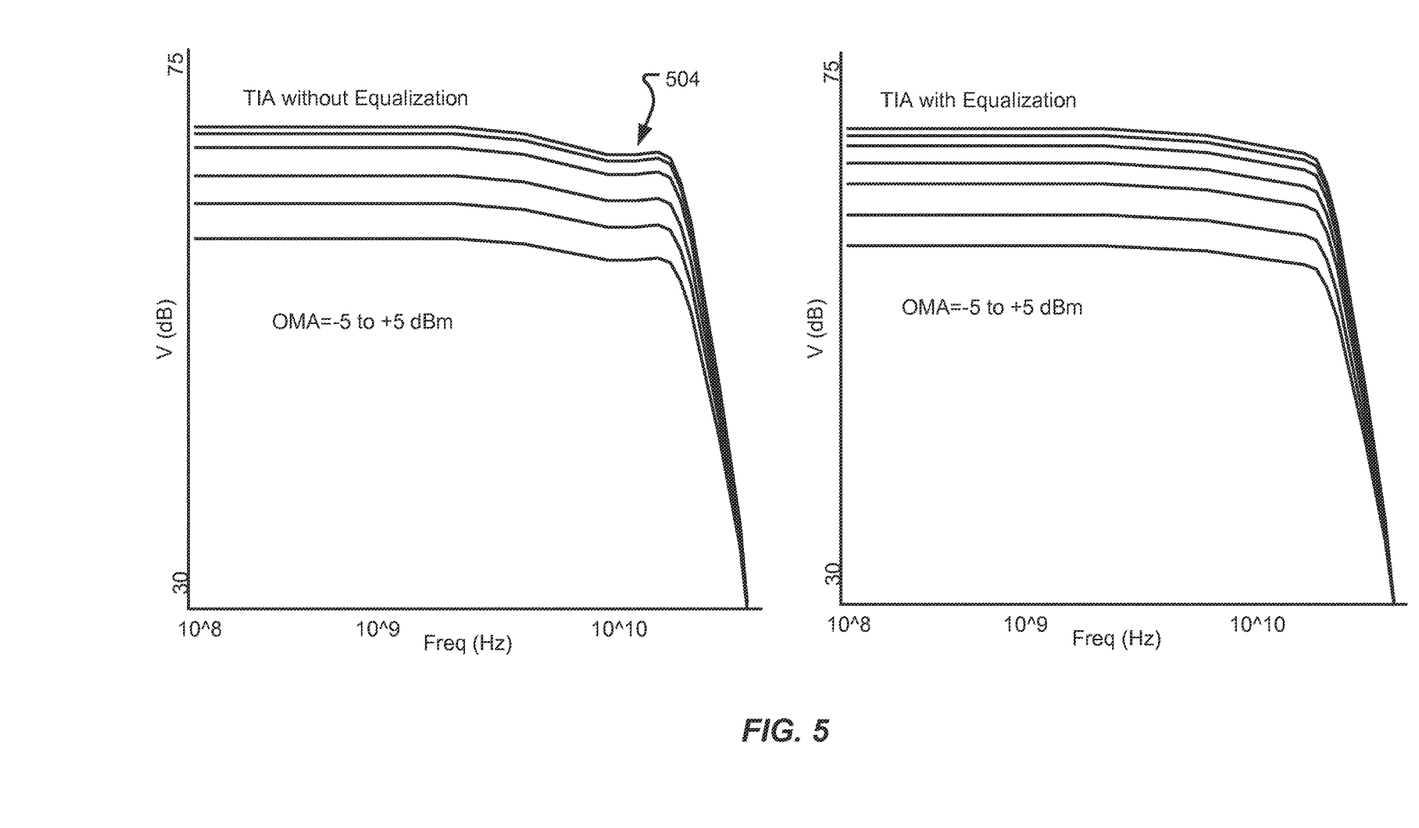
FIG. 5 is a diagram depicting a frequency response of a TIA with and without the equalization circuit in accordance with at least some embodiments of the present disclosure.

Specifically, as can be seen in FIG. 5, the frequency response of the TIA without equalization may include one or more dips or imperfections 504 due to the losses and other problems at the input to the TIA 312. However, utilization of the equalization scheme proposed herein (e.g., using the tunable capacitor network 308) provides an improved output that is substantially equalized and the dips or imperfections 504 are smoothed out. This substantially enables the overall communication system 100 to utilize higher data communication rates due to better bandwidth performance and reduction of losses.

Figure 6:
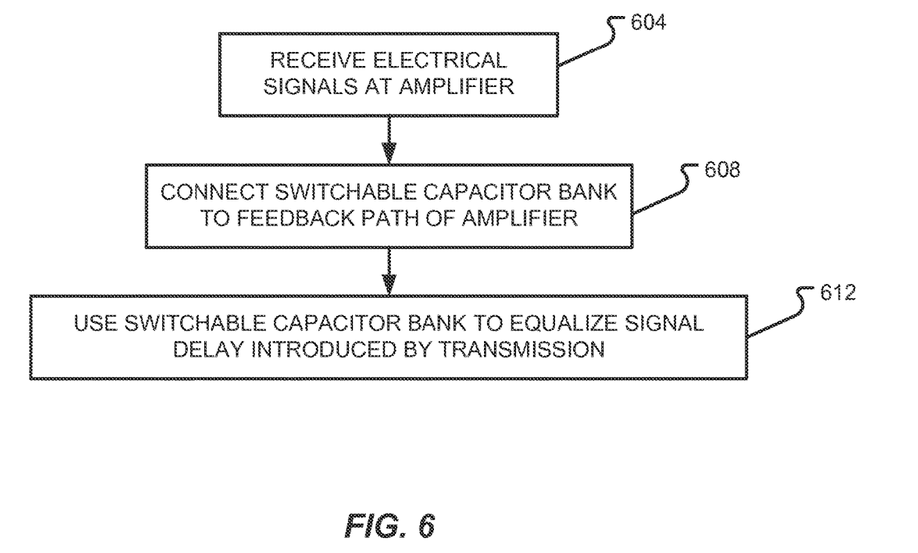
FIG. 6 is a flow diagram depicting a method of operating an optical communication system in accordance with at least some embodiments of the present disclosure.

With reference now to FIG. 6, a method of operating an optical communication system will be described in accordance with at least some embodiments of the present disclosure. The method begins when an electrical signal is received at an amplifier (step 604). The amplifier that receives the electrical signal may correspond to a TIA receiving an electrical output of a photodiode. The amplifier may also have a feedback loop or path that is used to equalize the signal received at its input. In some embodiments, a tunable capacitor bank is connected to the feedback loop or path of the amplifier (step 608). Switches within the tunable capacitor bank can then be used to introduce one or more capacitors to the feedback loop or path, thereby equalizing signal delay introduced during transmission of the signal (step 612).

Specific details were given in the description to provide a thorough understanding of the embodiments. However, it will be understood by one of ordinary skill in the art that the embodiments may be practiced without these specific details. In other instances, well-known circuits, processes, algorithms, structures, and techniques may be shown without unnecessary detail in order to avoid obscuring the embodiments.

While illustrative embodiments of the disclosure have been described in detail herein, it is to be understood that the inventive concepts may be otherwise variously embodied and employed, and that the appended claims are intended to be construed to include such variations, except as limited by the prior art.

What is claimed is:

1. An optical communication system, comprising:
   a photodiode configured to receive optical signals and convert the received optical signals into electrical signals;
   a Trans-Impedance Amplifier (TIA) electrically connected with the photodiode such that the TIA receives the electrical signals from the photodiode and is configured to convert the electrical signals received from the photodiode into amplified electrical signals; and
   a feedback loop connected between an input of the TIA and an output of the TIA, wherein the feedback loop comprises a switchable capacitor bank connected thereto which introduces at least one zero into a feedback factor transfer function of the TIA thereby tuning out poles or equalizing delay introduced by a TIA input network connected between the photodiode and the input of the TIA.

2. The optical communication system of claim 1, wherein the feedback loop comprises a feedback resistor.

3. The optical communication system of claim 2, wherein the feedback resistor is split into two different resistors and wherein the switchable capacitor bank is connected between the two different resistors thereby creating a T-type feedback network.

4. The optical communication system of claim 3, wherein the switchable capacitor bank comprises a plurality of capacitors.

5. The optical communication system of claim 4, wherein the plurality of capacitors in the switchable capacitor bank are connected in parallel with one another.

6. The optical communication system of claim 3, wherein the feedback resistor is substantially equally split between the two different resistors.

7. The optical communication system of claim 1, wherein the TIA and feedback loop are implemented on a single Integrated Circuit (IC) chip and wherein the capacitors in the switchable capacitor bank correspond to passive capacitors on the IC chip.

8. The optical communication system of claim 1, wherein the photodiode is connected to the input of the TIA by a bond-wire.

9. The optical communication system of claim 1, wherein the photodiode is connected to the input of the TIA by a flip-chip bump and transmission line.

10. The optical communication system of claim 1, wherein the photodiode comprises a P-I-N photodiode.

11. A circuit, comprising:
    a Trans-Impedance Amplifier (TIA) having an input and an output, the input being configured to receive electrical signals, the output being configured to output amplified electrical signals;
    a feedback path connecting the output of the TIA with the input of the TIA, the feedback path including at least one feedback resistor; and
    a switchable capacitor bank connected to the feedback path, wherein the switchable capacitor bank equalizes signal delay introduced by transmission of the electrical signal to the input of the TIA.

12. The circuit of claim 11, wherein the switchable capacitor bank further introduces at least one zero into a feedback factor transfer function of the TIA thereby tuning out poles introduced by a TIA input network connected to the input of the TIA.

13. The circuit of claim 12, wherein the TIA input network comprises a bondwire that comprises an inherent inductance.

14. The circuit of claim 12, wherein the TIA input network comprises a transmission line and a flip-chip bond pad that comprises an inherent capacitance.

15. The circuit of claim 11, wherein the switchable capacitor bank comprises at least a first capacitor and at least a second capacitor connected in parallel with one another.

16. The circuit of claim 15, wherein the at least a first capacitor and the at least a second capacitor comprise a different capacitance.

17. The circuit of claim 16, wherein the at least one feedback resistor comprises a first feedback resistor and a second feedback resistor that comprise substantially the same resistance, wherein the switchable capacitor bank is connected between the first resistor and the second resistor thereby creating a T-network.

18. A method of operating an optical communication system, comprising:
    receiving electrical signals at an input of a Trans-Impedance Amplifier (TIA);
    connecting a switchable capacitor bank to a feedback path of the TIA; and
    using the switchable capacitor bank to equalize signal delay introduced by transmission of the electrical signal to the input of the TIA.

19. The method of claim 18, wherein the switchable capacitor bank further introduces at least one zero into a feedback factor transfer function of the TIA thereby tuning out poles introduced by a TIA input network connected to the input of the TIA.

20. The method of claim 19, wherein the TIA input network comprises at least one of: (i) a bondwire that comprises an inherent inductance and (ii) a transmission line and flip-chip bond pad that comprises an inherent capacitance.

* * * * *